United States Patent [19]

Chan

[11] Patent Number: 4,542,733
[45] Date of Patent: Sep. 24, 1985

[54] PORTABLE GAS FIRED BARBECUE

[76] Inventor: Ming K. Chan, 1st Floor, 58 Hung To Rd., Kowloon, Hong Kong

[21] Appl. No.: 532,272

[22] Filed: Sep. 14, 1983

[30] Foreign Application Priority Data

Sep. 16, 1982 [GB] United Kingdom ................. 8226405

[51] Int. Cl.[4] ........................... A47J 37/00; F24C 3/00
[52] U.S. Cl. ................................. 126/41 R; 126/25 R
[58] Field of Search ............ 126/9 R, 9 A, 9 B, 25 A, 126/25 R, 25 AA, 1 R, 41 R, 25 B

[56] References Cited

U.S. PATENT DOCUMENTS

| 2,467,480 | 4/1949 | Hudson | 126/9 R |
| 3,331,365 | 7/1967 | Sussan | 126/25 R |
| 3,566,856 | 3/1971 | Linstead | 126/25 |
| 3,617,022 | 3/1969 | Wiggins | 126/25 |
| 3,667,449 | 6/1972 | Persinger | 126/41 R |
| 3,688,758 | 9/1972 | Stephen, Jr. | 126/41 R |
| 4,188,937 | 2/1980 | Baynes | 126/41 R |
| 4,457,290 | 7/1984 | Edwards | 126/9 R |

Primary Examiner—James C. Yeung
Attorney, Agent, or Firm—Fay, Sharpe, Fagan, Minnich & McKee

[57] ABSTRACT

This invention relates to a portable gas fired barbecue having a part-spherical bowl provided at its lower part with a gas burner which can be fitted to a gas container and which has a regulator valve. Supported within the bowl is a grid which supports solid fuel or material which will glow hot when heated, and a cooking grid is located above the grid and fuel. The cooking grid can be positioned in two alternative positions and is provided with a slideable handle which when the grid is in the lower position can engage with a slot provided in the wall of the bowl to hold the grid fixed to the bowl so that solid fuel can not be spilled when the barbecue is lifted and moved using a carrying handle.

4 Claims, 4 Drawing Figures

PORTABLE GAS FIRED BARBECUE

SUMMARY OF THE INVENTION

This invention relates to a gas fired barbecue.

According to the present invention there is provided a portable barbecue comprising a part-spherical bowl provided at its lower part with a gas burner, means for connecting the gas burner to a gas supply, valve means for regulating the supply of gas to the burner, a first grid supported within the bowl and located above the gas burner for supporting a solid fuel, and a second grid supported by the bowl and located above the first grid.

BRIEF DESCRIPTION OF THE DRAWINGS

To the accomplishment of the foregoing and related ends, the invention then comprises the features hereinafter full described and particularly pointed out in the claims, the following description and annexed drawings setting forth in detail an illustrative embodiment of the invention, this being indicative however of only one way in which the principle of the invention may be enlarged.

In said annexed drawings.

DESCRIPTION OF THE PREFERRED EMBODIMENT

Figure 1:
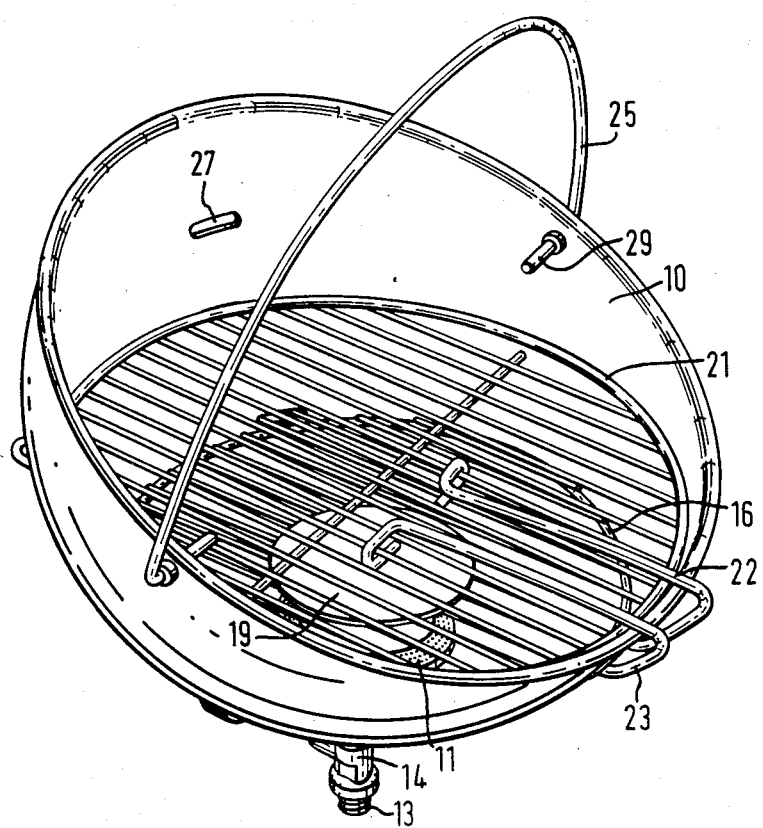
FIG. 1 is a perspective view of the barbecue in a carrying condition.
Figure 2:
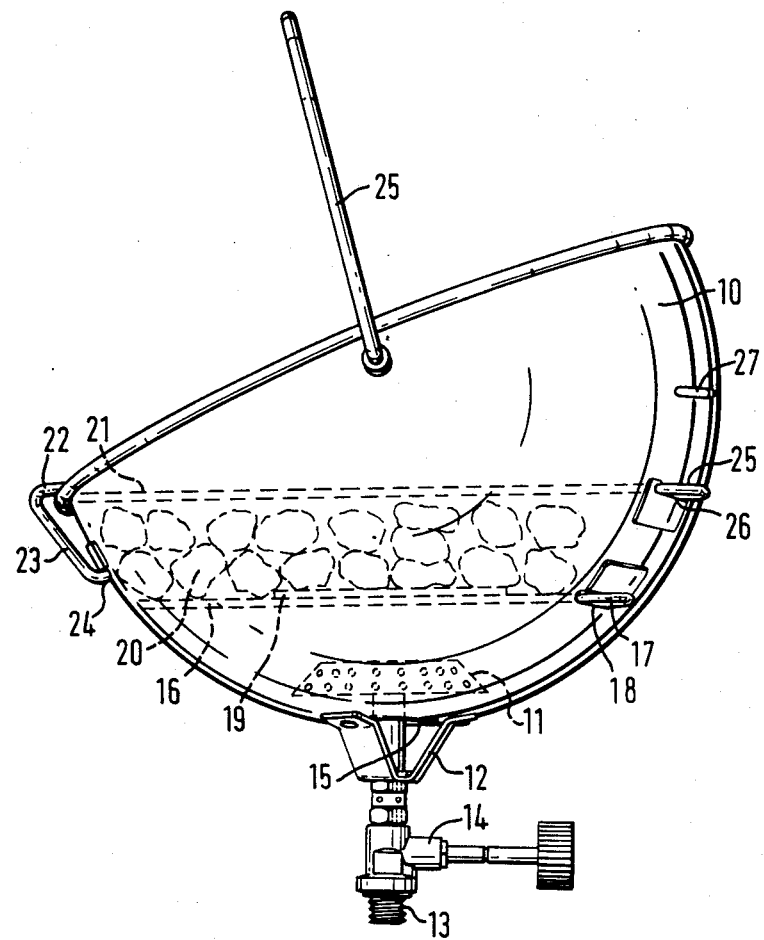
FIG. 2 is a side elevation of the barbecue.
Figure 3:
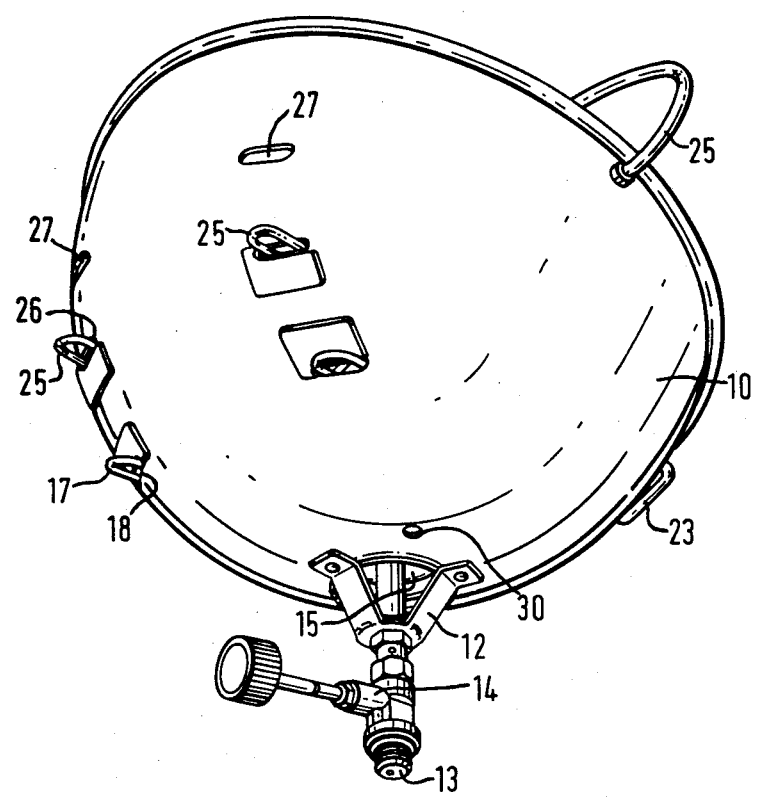
FIG. 3 is a perspective view on the underside of the barbecue.

The barbecue comprises a part-spherical bowl 10 formed of metal, such as steel. At its lower part the bowl 10 is provided with a gas burner 11 which is fixed to support 12 secured to the underside of the bowl 10. The burner 11 is provided with a screw-threaded connector 13 through which it is connected to a source of gas under pressure, preferably a gas container. A regulator valve 14 is provided for controlling the flow of gas to the burner 11. The burner 11 extends through an opening 15 which allows combustion supporting air to flow into the bowl 10 in the region of the burner 11.

A circular grid 16 is located within the bowl 10 above the burner 11. The grid 16 is provided with a pair of projections 17 which extend through a pair of slots 18 provided in the wall of the bowl 10 and which serve to locate the grid 16 with respect to the bowl 10. The grid 16 is provided at its centre with a circular plate 19 which acts as a diffuser or deflector for radially spreading the heat and flame from the burner 11.

The grid 16 supports solid fuel 20 which may be charcoal or any other suitable fuel. Alternatively the fuel 20 may comprise a material which does not actually burn but which when heated glows hot and radiates heat, such as lava rock.

Figure 4:
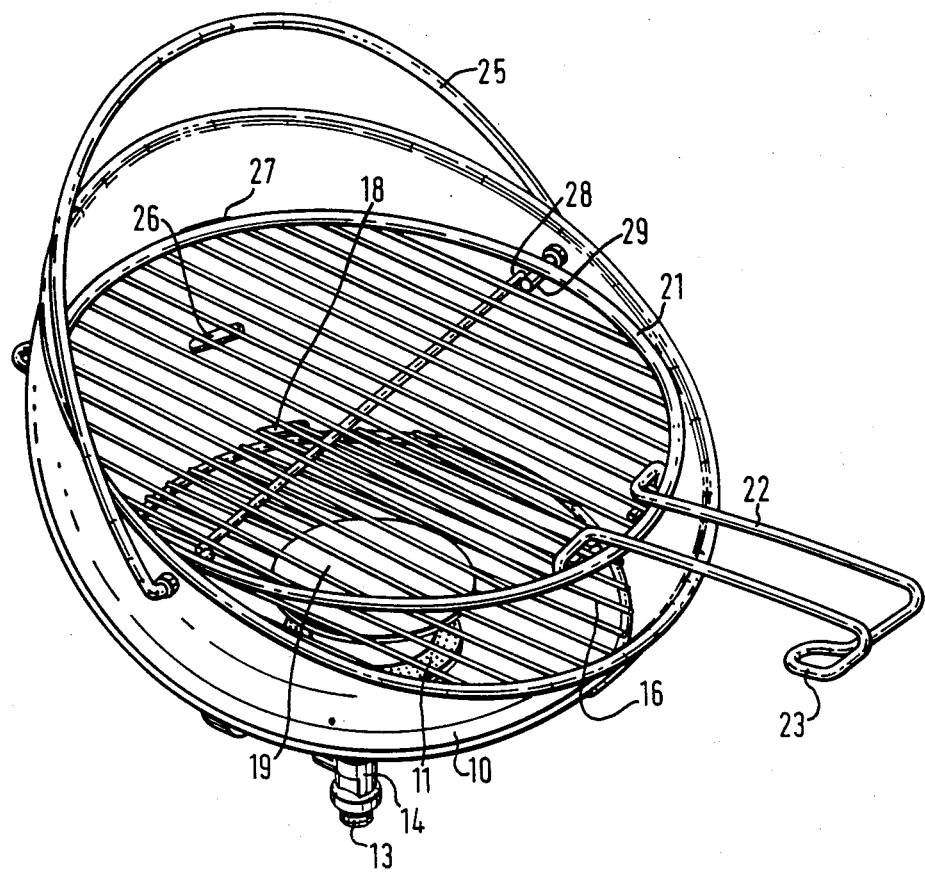
FIG. 4 is a perspective view similar to FIG. 1 but showing the barbecue in a cooking condition.

Located above the grid 16 and solid fuel 20 is a circular cooking grid 21 having a slideable handle 22. The grid 21 can be positioned in two alternative positions, a first position as shown in FIG. 1 and a second higher position as shown in FIG. 4. When in the lower first position the handle 22 can be moved to an innermost position in which a bent end 23 of the handle 22 is engaged in a slot 24 provided in the wall of the bowl 10. The grid 21 is also provided with two projections 25 which in the lower position of the grid 21 engage with two slots 26 provided in the wall of the bowl 10. With the end 23 of the handle 22 engaged in the slot 24 the grid 21 is held securely in the lower position preventing the solid fuel 20 from being spilled when the bowl 10 is lifted and moved by using a lifting handle 25 fitted to the bowl 10.

When the grid 21 is fitted in the second higher position the two projections 25 engage with two slots 27 provided on the wall of the bowl 10. In this higher position a bar 28 provided on the grid 21 engages behind bent ends 29 of the handle 25 and the grid 21 rests on the ends 29. The grid 21 is therefore located with respect to the bowl 10.

It will be seen from the drawings that the upper edge of the bowl 10 is inclined to the horizontal when attached to the gas supply cylinder.

The lower part of the bowl 10 is provided with a hole 30 to enable any fat to be drained out of the bowl 10.

While the embodiment of the invention has been described, it will be obvious to those skilled in the art that various changes and modifications may be made without departing from the invention as defined in the appended claims.

I, therefore particularly point out and distinctly claim as my invention:

1. A portable barbecue comprising:
   a part-spherical bowl provided at its lower part with a gas burner,
   means for connecting the gas burner to a source of gas under pressure,
   valve means for regulating the supply of gas to the burner,
   a first grid supported within the bowl and located above the gas burner for supporting a heatable substance,
   a second grid supported by the bowl and spaced above the first grid, and,
   means for positioning the grids such that the second grid can be located in alternative positions in the bowl, said positioning means including a handle provided on the second grid and being slidable between an outer position used for lifting the second grid and an inner position in which part of the handle engages in a slot provided in the wall of the bowl to hold the grid in position.

2. A portable barbecue as claimed in claim 1 wherein said first grid includes a central diffuser portion for deflecting the heat and flame from the burner radially outward.

3. A portable barbecue as claimed in claim 1 wherein the means for positioning further includes projections on each of the grids, and slots in the wall of the bowl engageable by the projections for selectively locating the grids with respect to the bowl.

4. A portable barbecue comprising:
   a part-spherical bowl provided at its lower part with a gas burner;
   means for connecting the gas burner to a source of gas under pressure;
   valve means for regulating the supply of gas to the burner;
   a first grid supported within the bowl and located above the gas burner for supporting a heatable substance, said first grid having a central diffuser associated therewith for deflecting the heat and flame from the burner radially outward;

a second grid supported by the bowl and located in spaced relation above the first grid;

means for positioning the grids in the bowl such that the second grid can be located in at least two alternative positions; and, said means for positioning including a handle on the second grid which is slidable between a first outer position used for lifting the second grid and a second inner position with a portion of the handle engaging in a slot provided in the wall of the bowl for retaining the grid in position.

* * * * *